United States Patent [19]

Minnicks, III

[11] 4,173,080

[45] Nov. 6, 1979

[54] RADIO NAVIGATION TRAINING DEVICE

[76] Inventor: Paul Minnicks, III, 255 Lee Rd., Brookfield, Ohio 44403

[21] Appl. No.: 887,816

[22] Filed: Mar. 17, 1978

[51] Int. Cl.$^2$ ............................................. G09B 19/16
[52] U.S. Cl. ..................................... 35/10.25; 35/12 F
[58] Field of Search ..................... 35/12 R, 12 F, 10.2, 35/39; 235/88 N, 88 R, 61 NV, 78 R

[56] References Cited

U.S. PATENT DOCUMENTS

| | | | |
|---|---|---|---|
| 2,373,959 | 4/1945 | Horr | 35/10.2 |
| 2,404,386 | 7/1946 | Levine et al. | 35/10.2 |
| 2,485,674 | 10/1949 | Suiter | 35/10.2 X |
| 3,262,640 | 7/1966 | Jameson | 235/78 R |
| 3,364,599 | 1/1968 | Polsky | 35/39 |
| 3,485,929 | 12/1969 | Tillery | 35/10.2 |
| 3,546,351 | 12/1970 | Bryan | 35/10.2 |
| 3,825,180 | 7/1974 | Gallagher | 235/88 N |
| 3,906,643 | 9/1975 | McClung | 35/10.2 |

*Primary Examiner*—Vance Y. Hum
*Attorney, Agent, or Firm*—Webster B. Harpman

[57] ABSTRACT

A navigation training device for use with any pilot training text on radio navigation, the device has a visual representation of three actual aircraft instruments with movable parts to simulate the actual related readings on the instruments. A set of instructions are provided to instruct the student in the operation of the training device.

3 Claims, 2 Drawing Figures

RADIO NAVIGATION TRAINING DEVICE

BACKGROUND OF THE INVENTION (1) Field of the Invention

This invention relates to visual radio navigation training apparatus of the type which uses visual representations of radio navigational equipment.

(2) Description of the Prior Art

Prior structures of this type have utilized various types of instrument simulations. See for example U.S. Pat. Nos. 3,262,640, 3,546,351 and 3,906,643.

In U.S. Pat. No. 3,626,640 a variable course approach computer is disclosed having rotating information discs.

The present invention utilizes a rotatable disc for the simulated instruments only.

In U.S. Pat. No. 3,546,351 a navigation device is disclosed having a magnetic center and an aircraft facsimile for placement on the surface.

The present invention has no magnetic means or movable aircraft facsimile.

In U.S. Pat. No. 3,906,643 a mechanical V.O.R. device is disclosed having a series of information carrying meshed gears.

The present information has not such gear arrangement.

SUMMARY OF THE INVENTION

A navigation training device for use with any pilot training text on radio navigation comprising three visual representations of the navigation equipment with movable parts to simulate the changing instruments. The device is used according to instructions supplied with it for a ground simulation of an actual flight using radio navigation equipment, for example automatic direction finding equipment (A.D.F.).

DESCRIPTION OF THE PREFERRED EMBODIMENT

Figure 1:
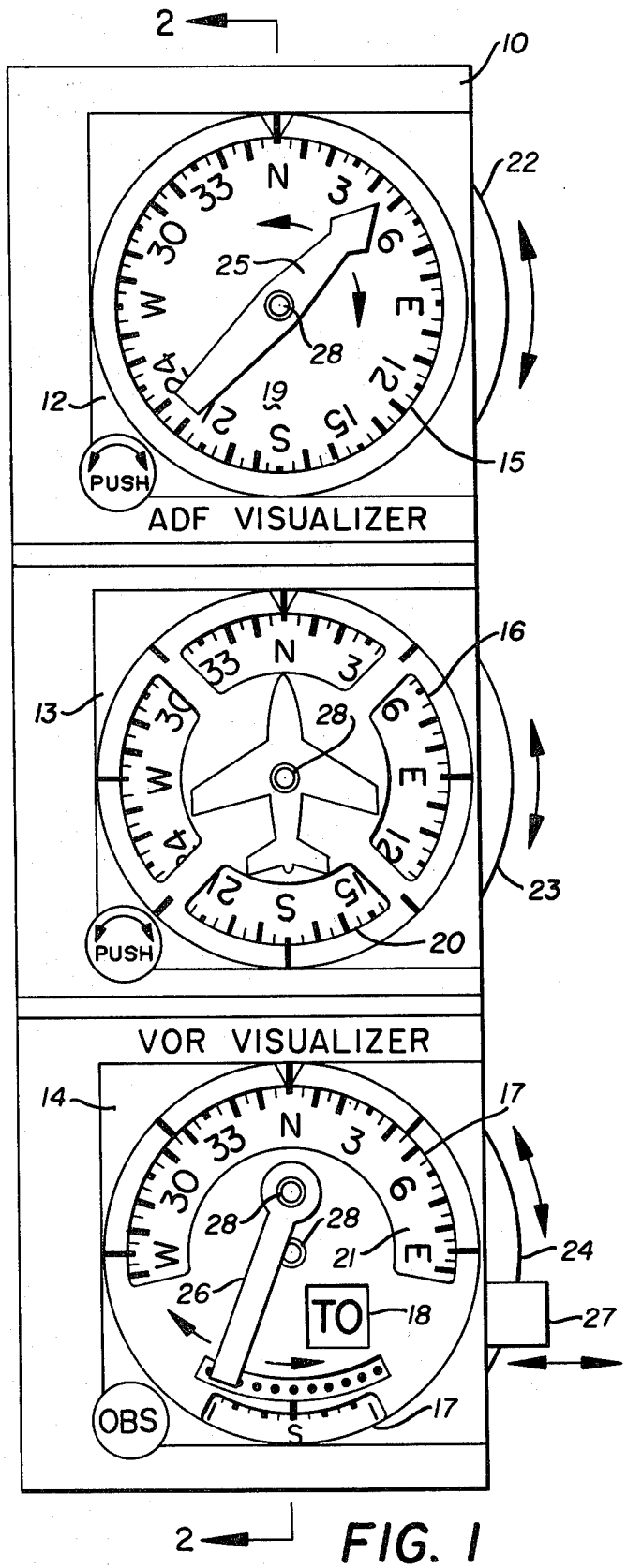
FIG. 1 is a top plan view of the navigation training device.
Figure 2:
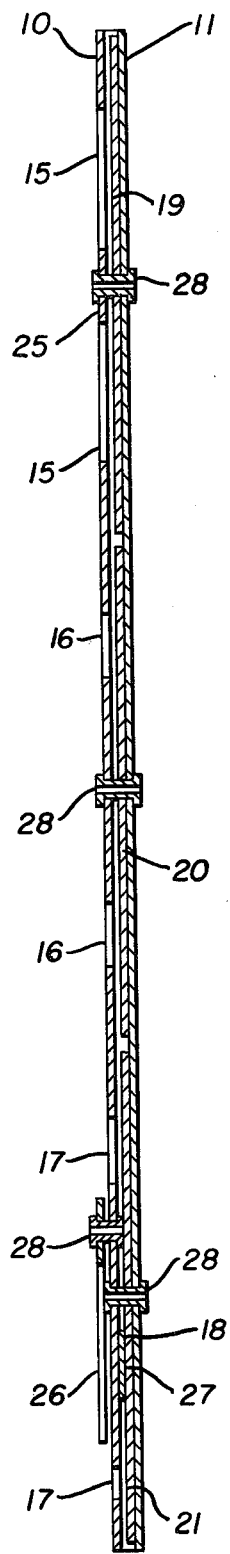
FIG. 2 is a section on line 2—2 of FIG. 1.

In FIGS. 1 and 2 of the drawings a navigation training device for use with any pilot text on radio navigation is illustrated comprising simulated aircraft instruments made from relatively stiff cardboard folded in half to produce an enclosure having a front portion 10 and a back portion 11. The front portion 10 has instrument representations 12, 13 and 14 printed thereon and a series of openings 15, 16, 17 and 18 that represent the viewing area of the simulated instruments.

The back portion 11 has instructions as to the use of the device. Three discs 19, 20 and 21 having aircraft compass faces printed on them are rotatably positioned between the front portion 10 and the back portion 11 of the device so as to be viewed through the openings 15, 16 and 17. The discs 19, 20 and 21 are of a size so that portions of their peripheral edges 22, 23 and 24 extend outwardly from the edges of the front and back portions 10 and 11.

Three instrument markers 25, 26 and 27 are positioned on the instrument representations 12 and 14. The instrument markers 25 and 26 are of a pointer type while said marker 27 has TO and FR printed thereon to indicate the direction to or from the radio navigation transmitter. The discs 20 and 21 are centrally rotatably secured to the front and back portions 10 and 11 by fasteners 28. The disc 19 and the instrument marker 25 are centrally and rotatably secured to the back portion 11 of the instrument representation 12. The instrument marker 26 is pivotally secured to the front portion 10 on the instrument representation 14 by a fastener 28. The instrument marker 27 is normally positioned within and viewed through the cut-out 18 on the instrument representation 14.

The visual simulation of actual flight instruments found in the aircraft are operated by rotating the discs and moving the instrument markers to such settings as to recreate the actual readings and visual representations of a fully functional radio navigation equipment.

In use the navigation training device as disclosed may be referred to as a visualizer which may be used in a three phase learning system. In phase one of such a system the navigation training device requires that a radio navigational problem be set up wherein magnetic directions are designated on an open space of a floor. The fixed navigational features are then placed on the floor using objects to be representative of a problem to be solved. By using the objects to orient the position, heading and track while holding the device in front of him, the student walks through the problem making all of the instrument changes of the device to correctly correspond with and to portray his present situation.

In phase two the student will get the actual winds aloft and plot a real navigational problem on a sectional map using the procedures in phase one. The student then flies the problem with a flight instructor or a qualified safety pilot accompanying him.

In phase three the student, as part of his regular preflight, uses the device to do the radio navigation problems he will encounter on that flight, first on the ground at his own pace.

Those skilled in the art will recognize V.O.R. as indicating very high frequency Omni range equipment, and O.B.S. as referring to an Omni bearing selector.

The disc 20 heretofore referred to as having a compass face is a representation of a D.G. or directional gyro or a magnetic compass.

Although but one embodiment of the present invention has been illustrated and described, it will be apparent to those skilled in the art that various changes and modifications may be made therein without departing from the spirit of the invention, and having thus described my invention what I claim is:

1. A navigation training device comprising:
    an elongate base sheet folded about itself to define a front section and a back section;
    a first arcuate cutout defined in said front section near the top of said front section;
    a first arcuate disc centrally rotatably fixed to said back section, said first disc having compass markings thereon and being positioned in said first arcuate cutout so said compass markings are visible through said first cutout, said first disc having an outer diameter larger than said first cutout and having a portion extending beyond an edge of said front section so that said first disc can be hand rotated;
    a first marker indicia on said base sheet face section immediately adjacent said first cutout;
    a first pointer centrally rotatably mounted on said back section over said first disc to rotate with respect to said first disc;

a plurality of second arcuate cutouts defined in said front section to be circularly oriented and to be spaced from said first cutout;

a second arcuate disc centrally rotatably fixed to said back section at the center of said circularly oriented second cutouts, said second disc having compass markings thereon and being positioned so said compass markings are visible through said second cutouts, said second disc having an outer diameter larger than the outer diameter of said circular orientation of said second cutouts and having a portion extending beyond the edge of said front section so that said second disc can be hand rotated;

a second marker indicia on said base sheet face section immediately adjacent one of said second cutouts;

a circular disc section fixedly located on said base sheet front section having the center thereof coincident with the center of said second cutout circular orientation and having an outer peripheral edge coinciding with inner edges of said second cutouts;

a third marker indicia on said circular disc section;

a plurality of third arcuate cutouts defined in said front section to be circularly oriented and to be spaced from said first and second cutouts;

a third arcuate disc centrally rotatably fixed to said back section at the center of said circularly oriented third cutouts, said third disc having two sets of compass markings thereon and being positioned so that each set of said compass markings is visible through one of said third cutouts, said third disc having an outer diameter larger than the outer diameter of said circular orientation of said third cutouts and having a portion extending beyond the edge of said front section so that said third disc can be hand rotated;

a fourth marker indicia on said base sheet face section immediately adjacent one of said third cutouts;

a fifth marker indicia on said base sheet face section immediately adjacent another one of said third cutouts;

a semi-circular disc section fixedly located on said base sheet front section so that a diameter thereof passes through the center of said circularly oriented third cutouts;

a second pointer rotatably mounted at one end thereof on said base sheet front section at a location spaced from the center of said circularly oriented third cutouts;

a polygonal cutout defined in said base sheet front section; and an elongate pull tab having indicia thereon and movably attached to said base sheet front section so said indicia will be visible through said polygonal cutout.

2. The navigation training device of claim 1 wherein said cutouts in and the indicia on said front section are arranged in a row.

3. The navigation training device of claim 1 wherein said pull tab has a plurality of markings thereon which are visible through said polygonal cutout in each of several positions.

* * * * *